Dec. 12, 1961     C. V. JONES, SR     3,012,767
ENERGY STORING AND SHOCK ABSORBING DEVICE
Filed April 17, 1961     2 Sheets-Sheet 1

INVENTOR
Coy V. Jones, Sr.

BY
ATTORNEY

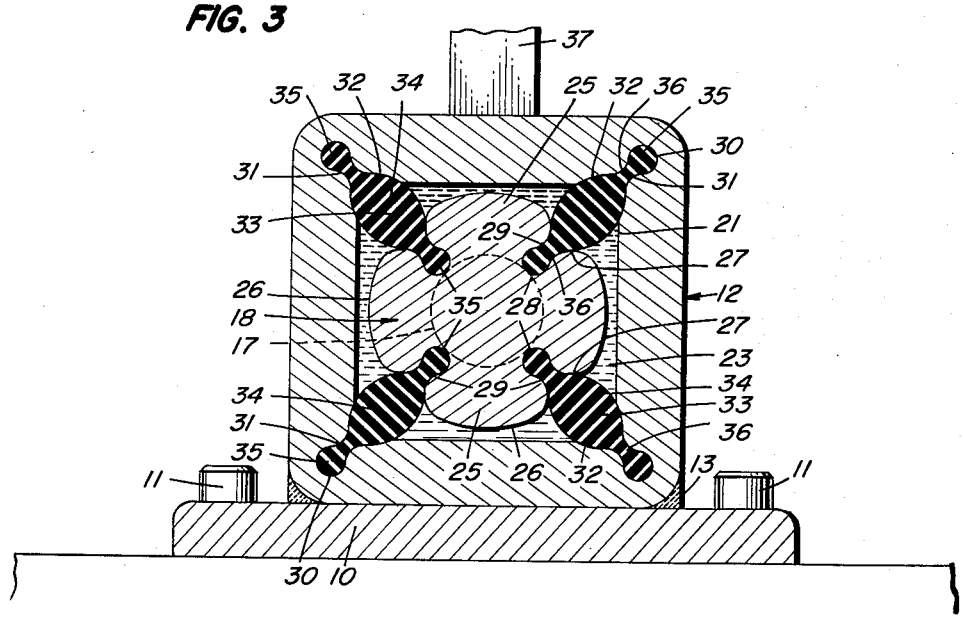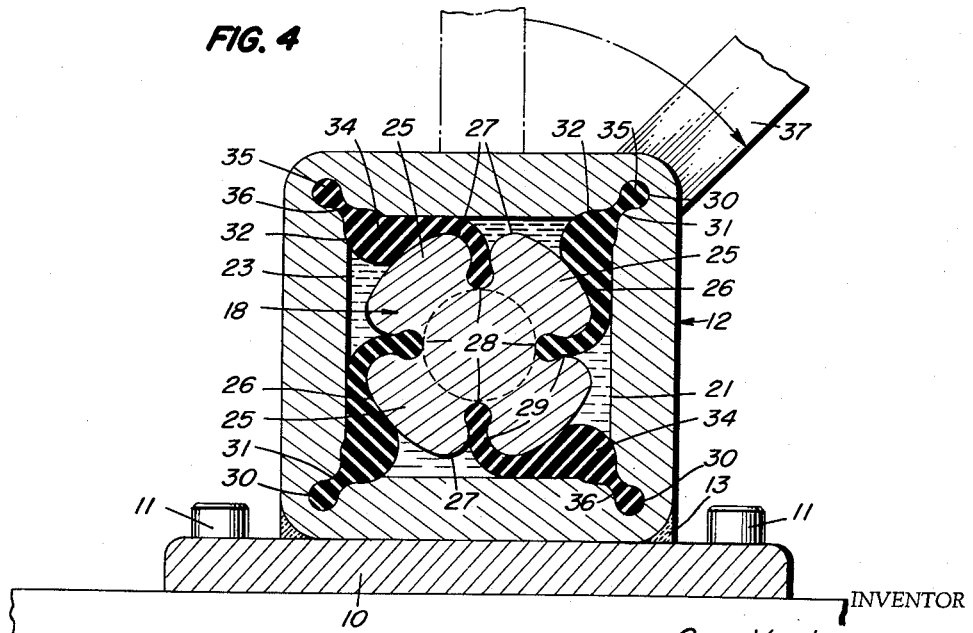

United States Patent Office 3,012,767
Patented Dec. 12, 1961

3,012,767
ENERGY STORING AND SHOCK ABSORBING DEVICE
Coy V. Jones, Sr., Charlotte, N.C., assignor to Southern Machinery Company, Greenville, S.C., a corporation of South Carolina
Filed Apr. 17, 1961, Ser. No. 103,626
8 Claims. (Cl. 267—21)

This invention relates to an energy storing device and/or shock absorber adaptable to a variety of practical applications.

An object of the invention is to provide a device of the mentioned character which utilizes in a novel manner and in sequence the stretchability and compressibility of rubber-like members to store energy, cushion or resist shock and to transmit torque to a desired instrumentality through a rotor connected with said members.

A further object of the invention is to provide a device of the mentioned character having its primary working elements fully enclosed and sealed within a chamber filled with lubricating fluid, thereby greatly extending the useful life of the mechanism over existing devices of a somewhat similar type which are open and exposed to foreign matter without any means for lubrication.

Another object of the invention is to provide a compact and durable self-contained unit of the mentioned type including a rotor having shaft extensions which are accurately journaled in fixed bearings so as to render the mechanism smooth and stable in operation without any possibility of parts becoming misaligned, binding or otherwise functioning improperly.

Still another object is to provide a device of the mentioned character which will absorb shock and transmit torque through a limited angular range on opposite sides of a neutral position of the primary rotor.

A further object is to provide an energy storing unit, shock absorber or torque producer which will have a relatively low torque characteristic or soft action through a limited angular range on either side of the neutral position and then a sharply increasing torque characteristic or shock absorbing capacity throughout the remainder of the operating range on either side of neutral.

Another object is to provide a unit of the mentioned type which may be readily serviced in the field with a minimum of labor and expense and without the necessity for special tools.

Another object is to provide a mechanism of the mentioned type particularly adapted for controlling the action of a loom picker stick, in conjunction with other loom instrumentalities; and also capable of a wide variety of additional uses, including automotive wheel suspension systems, shock absorber applications, automotive and otherwise, and spring retarding means for swinging doors and the like.

Other objects and advantages of the invention will be apparent during the course of the following description.

Figure 1:
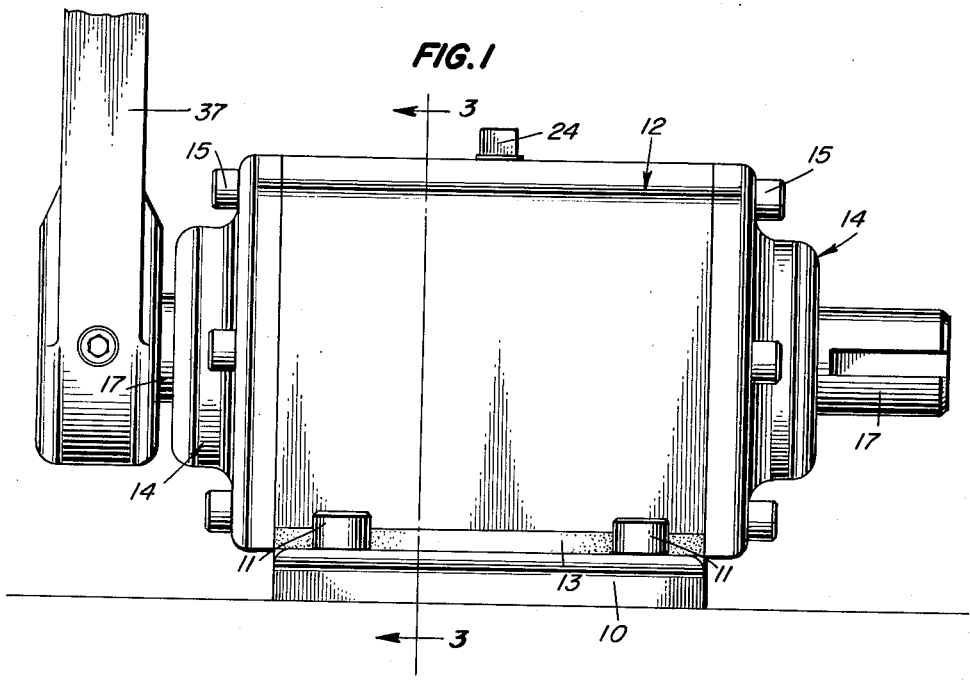
Figure 2:
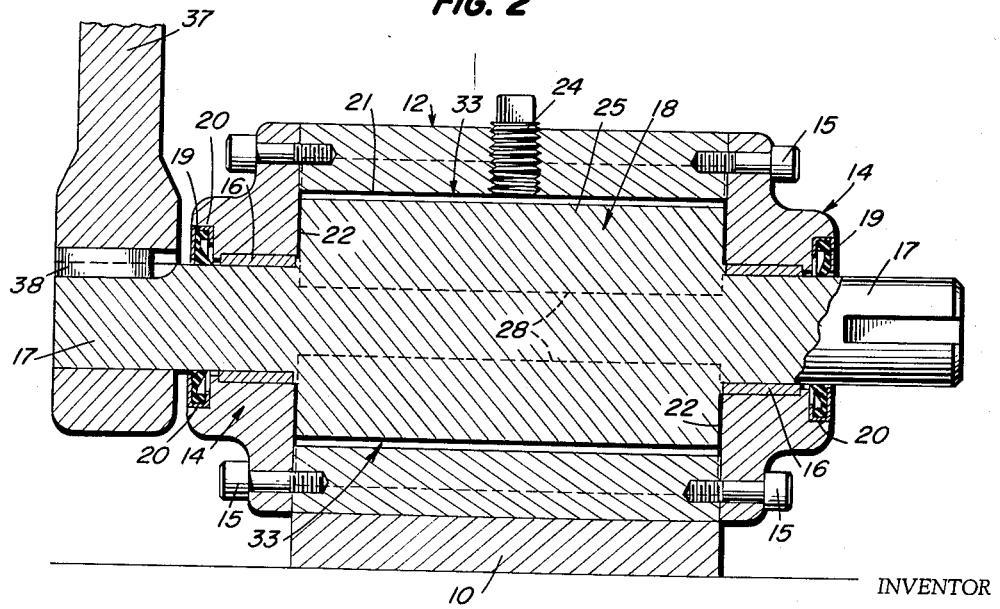

In the accompanying drawings forming a part of this application and in which like numerals are employed to designate like parts throughout the same, FIGURE 1 is a side elevation of an energy storing and shock absorber unit embodying the invention, FIGURE 2 is a central vertical longitudinal section through the same, FIGURE 3 is a transverse vertical section taken on line 3—3 of FIGURE 1 and showing the rotor in the neutral position, FIGURE 4 is a section similar to FIGURE 3 showing the rotor at one limit of its travel on one side of the neutral position.

In the drawings, wherein for the purpose of illustration is shown a preferred embodiment of the invention, the numeral 10 designates a rigid support plate or base adapted for secure attachment at 11 with any desired structural member. The mechanism of the invention need not be mounted horizontally as shown in the drawings for convenience of illustration but may depending upon the use or application of the same be mounted vertically or at any desired angle.

The device further embodies an open ended rigid tubular housing 12, preferably square in cross section, and fixedly secured to the plate 12 by welding or the like as at 13. A pair of end caps 14 for the housing 12 are provided, and detachably rigidly secured thereto by suitable screws 15. The end caps 14 have axially aligned bores containing suitable journal bearings 16 for rotatably supporting end shaft extensions 17 of a rotor 18 to be further described in detail hereinafter. Suitable shafts seals 19 for the shaft extensions 17 are contained within outer recesses 20 of the caps 14, as shown.

The rotor 18 is disposed centrally within the rectangular through opening 21 of housing 12 and has its periphery spaced somewhat from the opening 21 as shown in FIGURE 3. The rotor 18 is enlarged considerably relative to the shaft extensions 17 which are integral with the rotor, and the rotor occupies a substantial part of the interior space or chamber defined by the four walls of the housing 12 and the inner faces of the end caps 14. The end faces 22 of the rotor 18 are cut back and spaced slightly from the ends of the housing 12 and the inner faces of the end caps to allow for free circulation of suitable lubricating fluid 23 which preferably fills the interior of the housing 12 and completely surrounds the rotor 18 and associated elements to be described. A suitable removable filler plug 24 is provided in the top wall of the housing 12 for the ready introduction of the lubricating fluid or oil.

The rotor 18 embodies four circumferentially equidistantly spaced axially extending integrally connected portions or lobes 25 which extend continuously lengthwise of the rotor from end-to-end thereof. The peripheral faces 26 of the lobes 25 are arcuate and may be concentric throughout a portion of their lengths with the axis of the rotor and its shaft extensions 17. The opposite ends of each lobe 25 are smoothly rounded at 27 on radii which enable the lobe ends to blend smoothly into the arcuate faces 26 of the lobes. Between each pair of adjacent lobes 25 on the rotor, the same is provided with an axial relatively narrow slot 28, circularly curved in cross section on a radius of considerably less length than the radius of the lobe ends 27. The slots 28 are all parallel with the axis of the rotor and extend for the full length of the rotor and open through its opposite ends. Intermediate each slot 28 and the adjacent lobe ends 27 is a constricted longitudinal neck passage 29, also smoothly curved and joining the slots 28 and curved lobe ends 27 on a smooth arc. The inner ends or bottoms of the slots 28 may be substantially tangent to the circumference of the end shaft extensions 17 as shown in FIGURE 3 for ease of fabrication of the unitary rotor. Viewed in its entirety, the rotor 18 is generally cylindrical and symmetrical as shown in FIGURE 3.

At the four corners of the housing 12, the same is provided with companion anchoring slots 30 of the same diameter as the slots 28 and coextensive therewith longitudinally and parallel thereto and extending for the entire length of the housing and opening through its opposite ends. Reduced neck passages 31 having arcuately curved walls of similar design to the rotor neck passages 29 lead from the slots 30 diagonally with respect to the corners of the housing 12. The neck passages 31 open into enlarged smoothly rounded corner recesses 32 formed at the interior corners of the housing 12 directly opposite a pair of the lobe ends 27 of rotor 18 when the latter is at the neutral position shown in FIGURE 3.

Four elastic energy storing and shock absorbing members 33 formed of rubber, synthetic rubber or other rubber-like material are provided in the unit at the corners of the housing 12 for interconnecting the same resiliently with the rotor 18. The elements 33 extend lengthwise of the rotor 18 and housing 12 for their full lengths and span the space between the slots 28 and 30 diagonally when the rotor is at the neutral position, FIGURE 3.

Each resilient element 33 includes a relatively large central body portion 34 substantially oval-shaped in cross section and elongated diagonally or across corners with respect to the housing 12, FIGURE 3. The body portion 34 is rounded so as to seat snugly within the corner recesses 32 and against the arcuate ends 27 of the rotor lobes 25. Each resilient element 33 further embodies at its opposite longitudinal edges a pair of parallel continuous longitudinal beads 35, circular in cross section and adapted to sit snugly within the slots 28 and 30 of the rotor and housing respectively. Reduced neck portions 36 are formed upon each element 33 for snug fitting engagement within the neck passages 29 and 31, as shown. The enlarged beads 35 are of such size with respect to the neck passages 29 and 31 that they cannot be pulled through these neck passages and out of their holding grooves 28 and 30 when the elements 33 are under tension during the operation of the mechanism as will presently be described.

With continued reference to the drawings, the numeral 37 designates a torque arm for imparting limited rotation to the rotor 18 in either direction. Such arm is suitably keyed to one shaft extension 17 as at 38. The arm 37 may constitute the sole instrumentality connected with the mechanism to be driven thereby from the energy stored by the unit or retarded in its swinging movement by the inherent shock absorbing characteristics of the unit. The other shaft extension 17 which is an optional feature of the invention may be suitably and similarly connected with a second actuating or driven instrumentality similar to the arm 37 or identical therewith. In this connection, the device quite obviously may be utilized in a wide variety of ways, some of which have been enumerated in the introductory portion of this specification. As stated therein, an important application of this invention is for regulating the action of a loom picker stick subject to heavy impact from the well-known shuttle entering the shuttle box. The device of the invention will serve ideally to absorb the impact of the shuttle upon the picker stick and will then store energy which will aid in propelling the shuttle upon its return flight. The device is also admirably suited as a component of an automotive wheel suspension system and as a shock absorber and energy storage means for various analogous mechanisms.

In operation, with the device assembled as shown and described and with the housing preferably filled with a suitable lubricant, torque is applied to the rotor 18 through the arm 37 while the housing 12 is of course held stationary. The rotor 18 may be turned in either direction under torque loading from the neutral position shown in FIGURE 3 where the resilient elements 33 are unloaded or relaxed and serve to maintain the rotor at the neutral position. When torque is applied to the rotor 18, the same will rotate approximately fifteen degrees circumferentially from the neutral position in either direction with a very soft resistance to turning. Such soft resistance during approximately the first fifteen degrees of angular rotor movement is caused by the gradual stretching or lateral elongation of the resilient elements 33 held tightly at their longitudinal edges within the slots 28 and 30. As the stretching of the four elements 33 increases, the resistance of the rotor 18 to the torque placed upon it will gradually and smoothly increase. As the torque on the rotor continues to increase, the elements 33 will be stretched laterally the maximum amount provided for in the design of the mechanism, and the rotor lobes 25 will now begin to compress the enlarged oval body portions 34 between them and the side walls of the housing 12 as illustrated in FIGURE 4, which shows the approximate maximum degree of rotation of the rotor in one direction. The device is designed to allow turning of the rotor 18 approximately forty-five degrees from neutral in either direction, or a maximum of approximately ninety degrees of rotor movement. As soon as the rotor turns sufficiently far to begin the compression of the body portions 34, the resistance to the torque placed upon the rotor will steeply or sharply increase toward maximum resistance, and this will begin to occur after the rotor turns beyond approximately fifteen degrees from the neutral position in either direction. This high resistance to torque is provided for by the compression of the elements 33 rather than by stretching the same near their reduced neck portions as during approximately the first fifteen degrees of rotary movement. The action of the four resilient elements 33 is collective or additive, and the four rod-like elements 33 are fully capable of providing heavy resistance to rotor movement at or near the maximum travel of the arm 37 as shown in FIGURE 4. During the first fifteen degrees of rotor movement, the resistance to the rotor is soft and gradually increasing, and subsequently this resistance builds up rapidly but still very smoothly, therefore providing ideal shock absorbing characteristics, energy storing means and torque imparting capabilities on the return stroke of the rotor. It is believed in light of the above description that the mode of operation and the useful potentialities of the device should be fully apparent to anyone skilled in the art.

It should be noted that the working components of the device are fully enclosed and sealed within the housing and constantly flooded with lubricant. The liquid lubricant is free to circulate about the ends of the rotor 18 which are spaced slightly from the caps 12. The parts will be thoroughly lubricated and protected from foreign matter due to the use of the seals 19 and the device will have a very long operational life. The shaft extensions 17 are firmly journaled within the bearings 16 so that the operation of the rotor will be smooth, uniform and trouble-free without binding or misalignment of parts. The unit is very easy to service by merely removing the end caps 14 to thereby facilitate endwise removal of the entire rotor and ready replacement of the resilient elements 33 which are the only elements subject to appreciable wear or gradual fatigue. These elements may be slipped endwise into and from the slots 28 and 30 during servicing or replacement thereof. The elements 33 are well adapted to be formed by an extrusion process or by molding. The material for the elements 13 may be continuously extruded and then cut to the desired length quite economically. The entire device is simplified, highly compact and extremely sturdy and durable.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described the invention, I claim:

1. An energy storing and shock absorbing device comprising a relatively stationary housing having end bearing parts, a rotor enclosed within said housing and having end shaft extensions journaled for rotation upon said bearing parts, said rotor adapted to turn within said housing when torque is applied to one of said shaft extensions, and a plurality of circumferentially spaced resilient stretchable and compressible elements interconnecting said rotor and housing generally radially of the rotor and first stretching under influence of the torque applied to said rotor to gradually and softly resist such torque and then becoming compressed between parts of said rotor and housing under increased application of torque to the rotor and simultaneously sharply resisting such torque application to the rotor.

2. An energy storing and shock absorbing unit comprising a relatively stationary tubular housing which is substantially rectangular in cross section and open ended, a pair of end caps for said housing having aligned shaft bearing means and shaft sealing means, a rotor disposed within said housing between said end caps and substantially completely enclosed by the housing and end caps and having reduced shaft extensions journaled for rotation upon said bearing means, said rotor adapted to turn in said housing when torque is applied thereto, said housing adapted to contain lubricating fluid surrounding said rotor, said rotor having a plurality of circumferentially spaced longitudinal grooves in its periphery defining a corresponding number of circumferentially spaced rotor lobes which are smoothly rounded, said housing provided interiorly at its corners with a corresponding number of complementary grooves extending lengthwise thereof and parallel to the rotor grooves, there being reduced neck passages leading from the rotor grooves and housing grooves and communicating with the interior of the housing, and a corresponding number of rubber-like torque resisting elements resiliently interconnecting said rotor and housing and having enlarged compressible body portions disposed between the rotor and housing grooves and integral reduced neck portions disposed within said neck passages and longitudinal edge beads disposed snugly within said grooves of the rotor and housing, said rubber-like elements disposed diagonally of the housing and rotor across corners of the housing when the rotor is in a neutral position, said rubber-like elements adapted to first stretch to softly resist the torque applied to the rotor through a first increment of rotational movement of the rotor and then adapted to be compressed by said lobes against the housing side walls for strongly resisting torque applied to the rotor during a final increment of rotational movement of the rotor.

3. An energy storing and shock absorbing unit according to claim 2, wherein said first increment of rotational movement is of the order of fifteen degrees and said final increment is of the order of thirty degrees, the total rotational movement of the rotor in either direction from a neutral position being approximately forty-five degrees.

4. A device of character described comprising a rectangular tubular housing having end bearing parts, a rotor disposed within said housing and having shaft means journaled for free rotation upon said bearing parts, means to impart rotary movement to said rotor in opposite directions, said housing provided internally adjacent its corners with longitudinal continuous holding groove means, said rotor provided in its periphery with companion circumferentially equidistantly spaced holding groove means extending lengthwise of the rotor continuously and parallel to the holding groove means of the housing, and a corresponding number of stretchable and compressible elements formed of rubber-like material disposed in the corner portions of the housing and being substantially co-extensive lengthwise with the rotor and housing and having enlarged portions intermediate the periphery of the rotor and the corners of the housing and reduced longitudinal edge portions snugly engageable within the holding groove means of the rotor and housing, whereby limited rotational movement of the rotor in either direction from neutral will first stretch said elements laterally to softly resist torque on the rotor and then compress said enlarged portions to strongly resist torque on the rotor.

5. A device of the character described according to claim 4, and a body of liquid lubricant sealed within said housing and surrounding said rotor and elements to lubricate the same.

6. A device of the character described according to claim 4, and wherein said means to impart rotary movement to said rotor is a radial torque arm connected with said shaft means of the rotor.

7. A device of the character described according to claim 4, and wherein said enlarged portions of the elements are generally oval shaped in cross section and elongated and tapering toward the holding groove means of the rotor and housing and said reduced longitudinal edge portions include stretchable neck parts and longitudinal edge beads substantially circular in cross section for interlocking engagement with the holding groove means of the rotor and housing, the cross sectional shape of the holding groove means conforming to the cross sectional shape of said neck parts and beads.

8. A device of the character described comprising a substantially closed fluid tight housing adapted to contain liquid lubricant, a rotor journaled within said housing for rotation in opposite directions, means to turn the rotor, said rotor and housing having opposed complementary holding groove means formed therein, rounded compression lobes formed upon the rotor between the holding groove means thereof, and compressible stretchable torque resisting elements of rubber-like material for resiliently interconnecting the rotor and housing and progressively resisting the torque applied to the rotor and having enlarged compressible intermediate portions for compressive engagement by the rotor lobes and marginal stretchable reduced neck portions having interlocking engagement with the holding groove means of the rotor and housing, said stretchable neck portions first gently resisting torque applied to said rotor as the same begins to rotate, said rotor lobes subsequently compressing said enlarged intermediate portions against the housing to strongly resist torque applied to the rotor during continued rotation thereof.

References Cited in the file of this patent
UNITED STATES PATENTS
2,861,796    Rhor _____ Nov. 25, 1958

FOREIGN PATENTS
483,530    Great Britain _____ Apr. 21, 1938